United States Patent [19]
Marino

[11] Patent Number: 5,986,714
[45] Date of Patent: Nov. 16, 1999

[54] METHOD, APPARATUS AND COMPUTER PROGRAM PRODUCT FOR SELECTIVELY REDUCING BANDWIDTH OF REAL-TIME VIDEO DATA

[75] Inventor: Charles F. Marino, Vestal, N.Y.

[73] Assignee: International Business Machines Corporation, Armonk, N.Y.

[21] Appl. No.: 08/872,573

[22] Filed: Jun. 10, 1997

[51] Int. Cl.[6] .................................................. H04N 7/32
[52] U.S. Cl. ...................... 348/419; 348/384; 348/390; 709/101; 709/102
[58] Field of Search .................................... 348/419, 405, 348/390, 384; 395/292–305; 364/715.02; 345/202, 203; 382/233; 709/100–102; H04N 7/32

[56] References Cited

U.S. PATENT DOCUMENTS

| | | | |
|---|---|---|---|
| 4,800,431 | 1/1989 | Deering | 358/160 |
| 5,023,718 | 6/1991 | Soloff | 358/160 |
| 5,253,078 | 10/1993 | Balkanski et al. | 348/409 |
| 5,263,138 | 11/1993 | Wasserman et al. | 395/325 |
| 5,341,175 | 8/1994 | Koz | 348/552 |
| 5,576,765 | 11/1996 | Cheney et al. | 348/407 |
| 5,659,634 | 8/1997 | Yeh et al. | 382/232 |
| 5,680,151 | 10/1997 | Grimm et al. | 348/552 |
| 5,706,451 | 1/1998 | Lightbody et al. | 348/552 |
| 5,787,472 | 7/1998 | Dan et al. | 348/7 |
| 5,799,017 | 8/1998 | Gupta et al. | 370/419 |
| 5,812,144 | 9/1998 | Potu et al. | 345/439 |
| 5,812,789 | 9/1998 | Diaz et al. | 395/200.77 |
| 5,818,967 | 10/1998 | Bhattacharjee et al. | 382/233 |
| 5,854,640 | 12/1998 | North et al. | 345/515 |

*Primary Examiner*—Vu Le
*Attorney, Agent, or Firm*—Heslin & Rothenberg, P.C.

[57] ABSTRACT

Method, apparatus and computer program product are disclosed for selectively reducing the bandwidth of real-time video data for transmission on a bus having varying bandwidth, while minimizing perceptible loss of picture quality. After detecting an overflow condition within a buffer coupled to a bus, video data to be written to the buffer is discarded until a prior pending request for transmission of a pending block of video data from the buffer is granted and begun. After beginning the transmitting, the discarding of data is discontinued and new video data is written into the buffer. A next bus request is made for transmission of all remaining data in the buffer stored prior to detecting the overflow condition. The amount of discarded data in the line is monitored and used to determine an address for a new block of data stored after the discontinuity in the line of video data. Temporal redundancies between frames of a video image is employed to fill in the discontinuity in the line of video data by using correspondingly positioned data in a corresponding line of a prior frame or field.

16 Claims, 5 Drawing Sheets

HORIZONTAL VIDEO LINE | VIDEO PIXEL DATA
fig. 7A
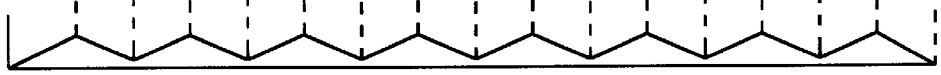
fig. 7B
fig. 7C
HORIZONTAL VIDEO LINE | VIDEO PIXEL DATA
fig. 8A
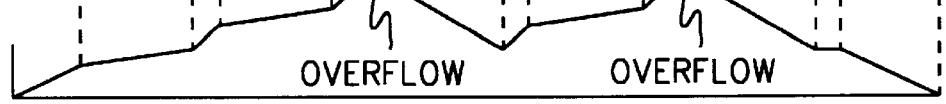
fig. 8B
fig. 8C

METHOD, APPARATUS AND COMPUTER PROGRAM PRODUCT FOR SELECTIVELY REDUCING BANDWIDTH OF REAL-TIME VIDEO DATA

TECHNICAL FIELD

This invention relates to video data processing and transfer, and more particularly to a method, apparatus and computer program product for selectively reducing the bandwidth of real-time video data for transmission on a bus having varying bandwidth, without perceptible loss of picture quality.

BACKGROUND OF INVENTION

The moving picture experts group (MPEG) MPEG-2 standard is a compression/decompression standard for interactive video applications. The standard describes an encoding method that results in substantial bandwidth reduction by a subjective lossy compression followed by a lossless compression. The encoded, compressed digital data is subsequently decompressed and decoded in an MPEG-2 compliant decoder.

The MPEG-2 standard specifies a very high compression technique that achieves compression not achievable with intraframe coding alone, while preserving the random access advantages of pure intraframe coding. The combination of frequency domain intraframe encoding and interpolative/predictive interframe encoding of the MPEG-2 standard results in a balance between intraframe encoding and interframe encoding.

The MPEG-2 standard exploits temporal redundancy for motion compensated interpolative and predictive encoding. That is, the assumption is made that "locally" the current picture can be modeled as a translation of the picture at a previous and/or future time. "Locally" implies that the amplitude and direction of the displacement are not the same everywhere in the picture.

The MPEG-2 standard further specifies predictive and interpolative interframe encoding and frequency domain intraframe encoding. It has block based motion compensation for the reduction of temporal redundancy and discrete cosine transform based compression for the reduction of spatial redundancy. Under MPEG-2, motion compensation is achieved by predictive coding, interpolative coding, and variable length coded motion vectors. The information relative to motion is based on a 16×16 array of pixels and is transmitted with the spatial information. It is compressed with variable length codes, such as Huffman codes.

Video decoding in accordance with the MPEG-2 standard is described in greater detailed in commonly assigned U.S. Pat. No. 5,576,765, entitled "Video Decoder," which is hereby incorporated herein in its entirety.

One aspect of current video decoding techniques is apparent from the following detailed example. An International Business Machines Corporation MPEGCD1M decoder is designed for a PC platform and its associated applications. This decoder provides a glueless interface to the PCI local bus, with multiple direct memory access ports for high performance data transfer capability. The decoder also provides for the capability to transmit decoded (i.e., decompressed) video image data to system memory or directly to a graphic accelerator's frame buffer. The prior destination is useful for video capture, while the latter destination is employed for display to the PC monitor.

The decompressed video data can have an approximate data rate of 27 MB/sec., and although a 33 MHz PCI bus has a theoretical bandwidth of 132 MB/sec., sufficient bandwidth may not be consistently available to transmit this video data. The PCI local bus does not guarantee that a certain bandwidth will always be available. Obviously, this might be a problem for the transmission of real-time video data without perceptible loss of picture quality.

The present invention addresses the above-noted issue, which can generally be stated as a desire to process decompressed, real-time video data for transmission on a non-real-time medium with minimal loss of perceptible picture quality.

DISCLOSURE OF THE INVENTION

Briefly summarized, the invention comprises in one aspect a method for processing a line of video data for transmission across a bus, the line of video data being temporarily written to a buffer. The buffer is coupled to the bus for reading of data in blocks from the buffer to the bus. The method includes: detecting an overflow condition within the buffer; upon detecting the overflow condition, discarding data from the line of video data being temporarily written to the buffer; upon granting of a pending request for transmission of a pending block of video data from the buffer, transmitting the pending block of video data from the buffer to the bus, the pending request being pending prior to the detecting of the overflow condition, and upon beginning the transmitting, discontinuing the discarding of data; and providing at least one next bus request for transmission of at least one next block of video data from the buffer to the bus, the at least one next block of video data comprising all remaining video data in the buffer stored therein prior to the discarding of data.

In another aspect, apparatus for processing a line of video data is disclosed. The apparatus includes a first-in first-out (FIFO) buffer, and a bus coupled to the FIFO buffer. The apparatus further includes a controller coupled to the FIFO buffer and to the bus for controlling the processing of the line of video data through the FIFO buffer for transmission across the bus. The controller comprises means for detecting an overflow condition within the buffer and means for discarding data from the line of video data being temporarily written to the buffer after detecting the overflow condition. The controller further includes means for transmitting a pending block of video data from the buffer upon granting of a pending request for transmission of the pending block of video data from the buffer. The pending request is pending prior to detecting of the overflow condition. Upon beginning the transmitting, means for discontinuing the discarding of data is provided, and thereafter for providing at least one next bus request for transmission of at least one next block of video data from the buffer to the bus. The at least one next block of video data comprises all remaining video data in the buffer stored prior to detecting the overflow condition.

In still another aspect, the invention comprises computer program product for processing a line of video data for transmission across the bus. The line of video data is temporarily written to a buffer, which is coupled to the bus for the reading of data in blocks from the buffer to the bus. The computer program product includes a computer usable medium having computer readable program code means embodied in the medium for causing a selective reduction in bandwidth of the line of video data. The computer program product has: computer readable program code means for causing the computer to detect an overflow condition within the buffer; computer readable program code means for causing the computer to discard data from the line of video data being temporarily written to the buffer upon detecting the overflow condition; computer readable program code means for causing the computer to transmit a pending block of video data from the buffer upon granting of a pending request for transmission of the pending block of video data from the buffer, the pending request being pending prior to detecting the overflow condition, and upon beginning the transmitting, to discontinue the discarding of data from the line of video data being temporarily written to the buffer; and computer readable program code means for causing the computer to provide at least one next bus request for transmission of at least one next block of video data from the buffer to the bus, the at least one next block of video data comprising all remaining video data in the buffer stored therein prior to detecting the overflow condition.

To restate, presented herein is an approach for transmitting real-time video data on a non-real-time medium with minimal loss of perceptible picture quality. The video data transfer apparatus takes advantage of the temporal redundancies between frames in the MPEG video system by dropping pixel data at random spatial locations corresponding to when insufficient bus bandwidth is available, and relying on the previously spatially located pixel data to replace the lost data. The effective result is transmission of a video image with "holes" or discontinuities where data was not transmitted. These holes are replaced by the previously spatially located pixel data. Thus, in accordance with the invention, the video processing system is able to tolerate greater occurrence of insufficient bus bandwidth without degrading perceptible picture quality. Processing in accordance with this invention can be performed in place of or in addition to conventional techniques for reducing bandwidth of decompressed video data.

BRIEF DESCRIPTION OF DRAWINGS

The above-described objects, advantages and features of the present invention, as well as others, will be more readily understood from the following detailed description of certain preferred embodiments of the invention, when considered in conjunction with the accompanying drawings in which:

FIGS. 7a, 7b & 7c depict a horizontal video line, transfer of video data packets, and buffer fullness, respectively, under normal processing conditions; and FIGS. 8a, 8b & 8c depict a horizontal video line, transmission of data packets where bus bandwidth is less than the pixel data rate coming into the buffer, and buffer fullness, respectively, for overflow recovery processing conditions addressed in accordance with the present invention.

BEST MODE FOR CARRYING OUT THE INVENTION

Several techniques are possible for use in reducing the bandwidth of decompressed video data for output on a bus having limited bandwidth. One technique would be to simply drop pixels in a predefined location to scale down the video. This is only effective for small scaling factors since video quality typically degrades to unacceptable limits when scaled down more than one-half times. Degrading of the video is especially noticed when it is scaled back up to restore the video image. Another technique is to perform a linear interpolation of adjacent pixels. However, this also proves to be a poor bandwidth limiting filter when scaled below one-half of the original image.

A further approach, comprising the present invention, is to take advantage of the temporal redundancies between frames. This approach can be performed in place of or in addition to the above-noted bandwidth limiting techniques.

Generally stated, a principal premise of the present invention is to drop pixel data in random spatial locations when insufficient bus bandwidth is available to receive the video data. The frame buffer, which is a destination of video data being sent across the bus, is constantly being overwritten with the video image data from the next frame. When a pixel is dropped, the previously spatially located pixel remains in place of the lost data. Since pixels are dropped randomly in accordance with the present invention, it is unlikely that the "old" pixel data is significantly different than the pixel data which was lost. This is because of the temporal redundant nature of video. The effective result is a transmitted video image with "holes" where data was not transmitted. The number and size of these holes is inversely proportional to the bus effective bandwidth. The resulting picture quality is also proportional to the amount of motion in the video sequence. A video sequence of little motion can tolerate the loss of more video data, i.e., bus bandwidth, and visa-versa.

The present invention is implemented by: controlling what data is buffered for bus transmission to the frame buffer; determining which pixels are dropped when bus bandwidth is unavailable; tracking how many pixels are dropped, and their pixel offset in a given line of video data; and determining when to resume buffering of pixel data by monitoring bus bandwidth.

Decoded video data is received for bus transfer typically at a constant rate, for example, at 1 pixel every 74 nanoseconds. The pixel format is assumed to comprise 4:2:2 YCrCb. Therefore, every pixel pair will consist of two luma (Y) pixels and one chroma pixel pair (Cr & Cb). This data can be buffered directly into a first-in first-out (FIFO) video output buffer, or it may be scaled through a half horizontal reduction filter, such as depicted in FIG. 1, to limit bandwidth before being stored into the FIFO.

Figure 1:
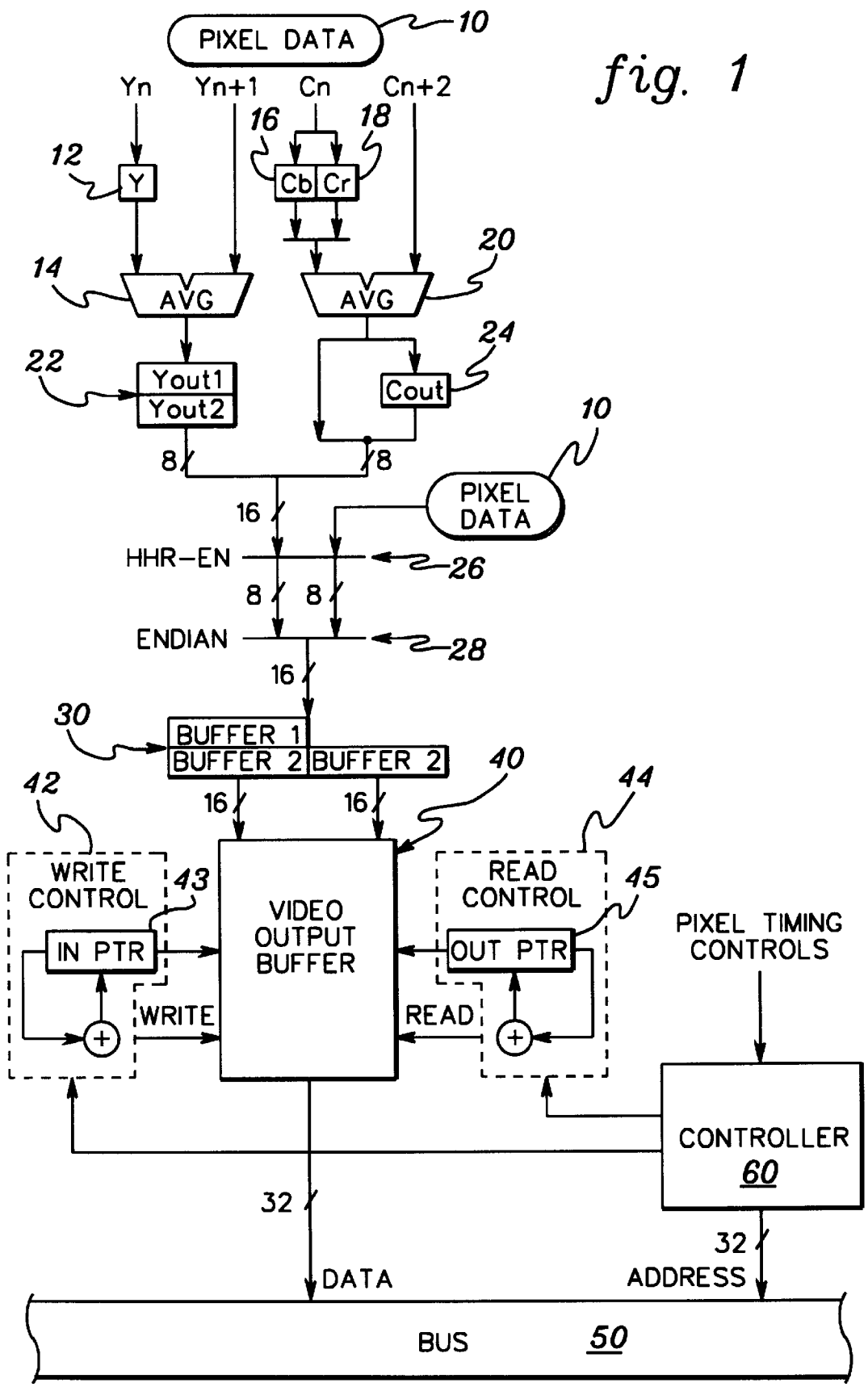
FIG. 1 shows a video data transfer apparatus to employ the data processing and transfer approach of the present invention.

As noted, FIG. 1 depicts pixel data 10 being passed through a one-half horizontal resolution filter before being stored into the video output buffer (or FIFO buffer) 40. Specifically, pixel data of a current luma (Yn) and a next luma (Yn+1) is received at averaging logic 14 for 2:1 luma filtering. Timing is achieved by buffering luma (Yn) at buffer 12. Similarly, chroma pixels Cn and Cn+2 are averaged together by logic 20 for a 2:1 filtering. The chroma (Cn) pixel Cb and Cr are temporarily held at buffers 16 & 18, respectively, before being multiplexed into averaging logic 20, again to ensure timing with the chroma (Cn+2) pixel. By averaging two pixels together, the bandwidth for transmission over the bus is effectively cut in half. Output from averaging logic 14 are two luma values which are buffered 22 for merging with the averaged chroma (Cr and Cb) pixels output from averaging logic 20. Chroma pixel Cb is temporarily latched in buffer 24. The resultant compilation comprises $Y_1Cb_2Y_2Cr_2Y_3Cb_4Y_4Cr_4$, etc.

As shown in FIG. 1, the reduced bandwidth pixel data is multiplexed 26 with pixel data 10 employing a half horizontal resolution—enable (HHR—EN) signal. This signal allows selection between the half resolution or full resolution pixel data. Ordering of bytes is established at multiplexer 28 employing an "Endian" signal. Multiplexer 28 establishes byte ordering within a 32 bit word. Sixteen bits are output to buffers 30 which comprise the staging to generate the 32 bits of data to be output on bus 50. The 32 bits of data are temporarily held in video output buffer (or FIFO) 40 as shown.

The problem addressed by this invention arises because pixel data enters buffer 40 at a fixed rate while the bandwidth of bus 50 can vary. As data is saved into buffer 40, a bus resource request is sent by a controller 60. Bus latency comprises a delay between transmission of the request and granting of a bus resource for transmission of the corresponding block or packet of video data from buffer 40. This latency can be indeterminant in length and if too long, can cause overrunning of the buffer 40.

Buffer data is packetized for transmission onto the bus based on programmable settings. The packet sizes can be selected to be a specific byte size or they may be based on the buffer threshold. When a packet is ready for transmission, the bus is requested. When the bus request is granted, the data is written to the programmed target address in a series of burst cycles based on the packet size. Each packet will have a starting address (within a line of video data) which will be incremented by the packet size. This will repeat until an entire video line is transmitted. At this point, the starting address of the first packet for the next line is calculated in preparation for transmission of the next video line. Each line will be transmitted in this manner until a whole field or frame has been written. The start of the next field or frame will re-initialize the video packet starting address based on the programmed address settings.

When the bus bandwidth is less than the incoming video data rate some video data will be lost. Insufficient bus bandwidth may be due to other activity on the system which resulted in an increased latency from when the bus is requested until bus granting. When the bus latency is high enough, the buffer will overrun and video data must be dropped. Presented herein is a novel approach for determining what data is to be dropped.

Controller 60 in the video data transfer apparatus of FIG. 1 oversees packetizing of video data stored into video output buffer 40. This is accomplished through write control logic 42 and read control logic 44. As video data is written into buffer 40, an input pointer 43 is incremented, while reading of data from buffer 40 increments an output pointer 45. The difference between these pointers is a measure of the fullness of the buffer. As input, controller 60 receives pixel timing controls such as horizontal and vertical blanking signals, field ID, and valid frame signals. From these signals, and the state of the input and output pointers, the controller controls packetizing of video data in the buffer, requesting bus bandwidth for transmission of a packet, and outputting of an address signal corresponding to packetized video data output from the buffer to bus 50. In accordance with the present invention, controller 60 comprises the mechanism for tracking discontinuities in packetized video data output to the bus and ensuring that the appropriate address is sent for each packet or block of video data output as part of a video line.

Figure 2:
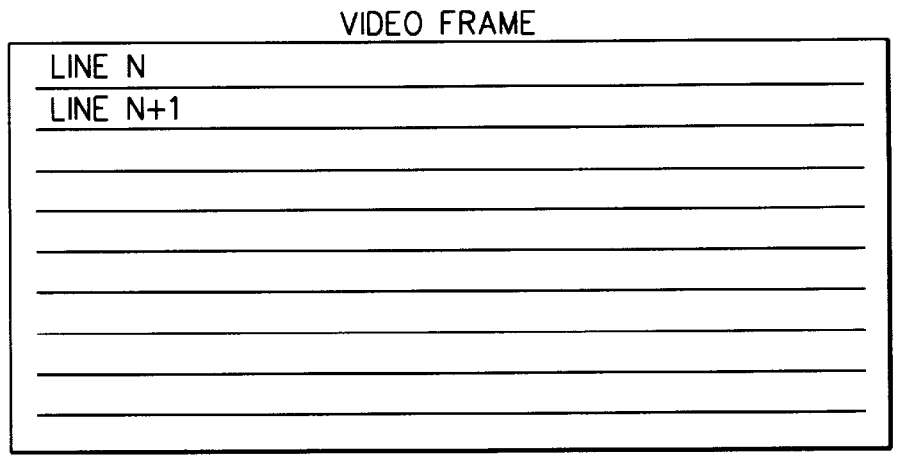
FIG. 2 is a representation of a video frame having multiple horizontal video lines to be processed in accordance with the present invention.
Figure 3A:
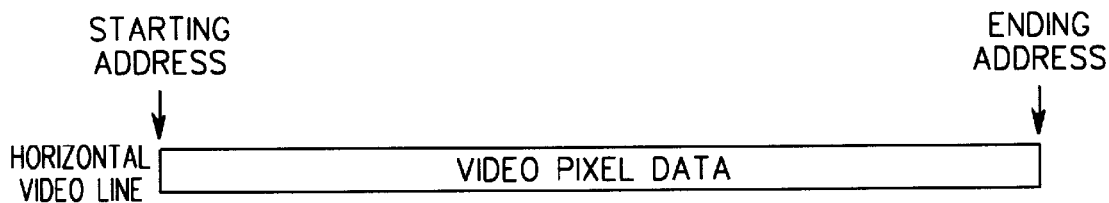
FIGS. 3a & 3b represent a horizontal video line and normal data packet processing thereof, respectively.
Figure 3B:
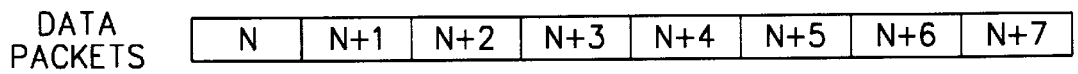

FIG. 2 is a depiction of one embodiment of a video frame or field having a plurality of horizontal video lines, each video line comprising a plurality of pixels. FIGS. 3a & 3b depict processing of video data stored into buffer 40 under "normal" conditions. The video data is represented in FIG. 3a as a horizontal video line which has a starting address and an ending address. Pixel location is represented as a displacement from the starting address. In FIG. 3b, packetized video data of FIG. 3a is shown to comprise packet N through packet N+7. In this embodiment, the packets are of equal size, and the packets contain video data with increasing addresses within the horizontal video line. Packet N is transmitted after a predetermined amount of video data has been stored into buffer 40.

In accordance with the present invention, upon detection of an overflow condition within buffer 40, incoming pixel data to the buffer is dropped until a pending bus request is serviced and buffered video data is started to be read from the buffer. A next bus request is then sent out by the controller and the controller prepares, i.e. packetizes, all remaining video data in the buffer for transmission. Simultaneous with this, the buffer begins to resume receiving incoming video data under normal operation. The controller also recalculates the starting address for a new packet to contain resumed video data to account for the pixel discontinuity.

Figure 4A:
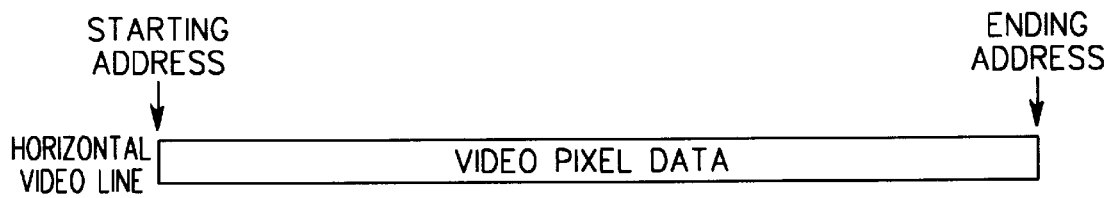
FIGS. 4a & 4b depict a horizontal video line, and data packet processing thereof pursuant to overflow recovery processing in accordance with the present invention, respectively.
Figure 4B:
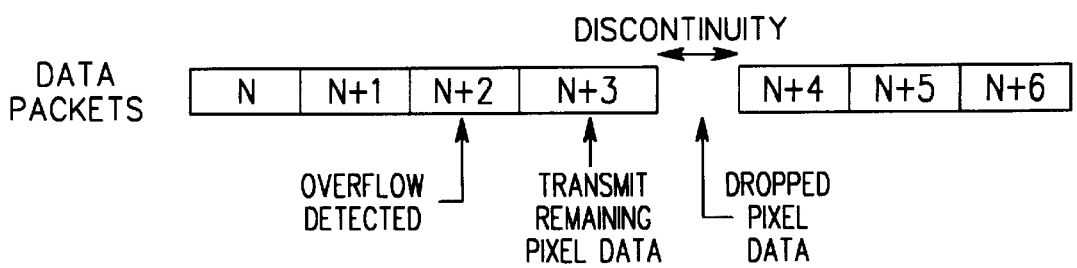

One example of this approach is depicted in FIGS. 4a & 4b wherein the horizontal video line of FIG. 4a is assumed to have overrun video output buffer 40 (FIG. 1) at some point during processing of the pixel data in the line. In FIG. 4b, packets N, N+1 and N+2 would essentially comprise the same packet size as depicted in FIG. 3b. However, since overflow is assumed to have been detected while waiting to transmit packet N+2, the next packet, i.e. packet N+3, encompasses all remaining data in the buffer. This is desirable since the controller is able to maintain address continuity by emptying the remaining contents of the buffer. The discontinuity is representative of the dropped pixel data and the remaining packets N+4 through N+6 are assumed to comprise standard packet sizes. Controller 60 (in accordance with the present invention) determines the starting address for packet N+4 based on the amount of data dropped during the discontinuity. Again, starting address for a packet of video data representative of pixels in a horizontal video line is determined as an offset from the starting address of the horizontal video line.

The discontinuity in the video image sequence has a duration equal to the latency from the buffer overrun to the time that the granting of the pending bus request for packet N+2 was received (plus some small overhead time). This elapsed time period is essentially random in nature. The overrun may be due to bus contention during heavy system activity or it could be that the destination address has a resource conflict. In any case, the destination frame buffer receives most of the video image data. The data that is not transmitted will be occupied by the image data from the previous frame. By taking advantage of the temporal redundancy of moving picture video, this "old" data should not be perceived by the viewer. Thus, in accordance with the present invention, higher bus latency can be tolerated without producing perceptible video degradation.

Figure 5:
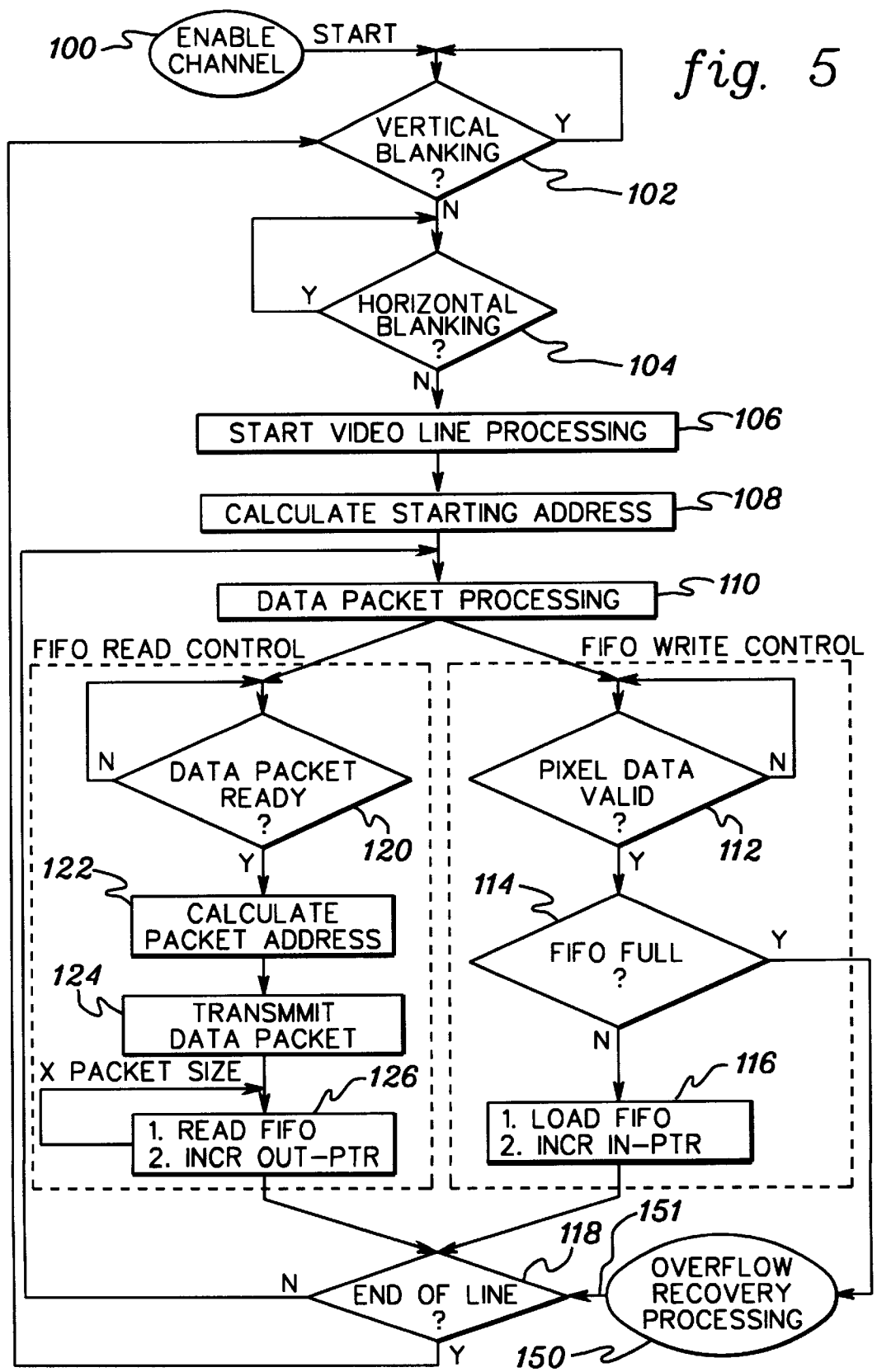
FIG. 5 is a flowchart of video data processing and transfer under normal conditions in accordance with the present invention.

FIG. 5 depicts a flowchart of video line processing through the video data transfer apparatus of FIG. 1 under normal conditions. After enabling a channel 100 for the transmission of video data in the video processing system, the transfer apparatus monitors received data for vertical blanking 102. Vertical blanking comprises a synchronization signal that is defined as the interval between frames when no video data is transmitted. At the start of a new frame or field, vertical blanking is no longer present and processing inquires whether horizontal blanking exists 104. The horizontal blanking interval comprises the blank time period from the end of one horizontal video line to the start of the next video line. If not in horizonal blanking, then video line processing is started 106.

The starting address for the video line is calculated as the address for that line within the frame buffer 108, and data packet processing 110 is commenced, which includes buffer write control and buffer read control as outlined in phantom. The read control and write control processings occur simultaneously. Beginning with the write control, processing initially inquires whether valid pixel data is received 112. If pixel data is not presently being captured, processing waits until the next valid pixel data. In one embodiment, pixel data may be written into the buffer every 74 nanoseconds. If valid pixel data is received, processing determines whether the video output buffer is full 114. If "yes", then overflow processing 150 (FIG. 6) in accordance with the present invention is called. Otherwise, the pixel data is loaded into the buffer and the input pointer 43 (FIG. 1) is incremented 116. Processing then determines whether the received pixel data is at an end of the video line 118. If "no", return is made to 110 for further data packet processing. Conversely, if a video line has just been completed, processing returns to inquiry 102 to determine whether vertical blanking is present.

As noted, buffer read control processing can occur simultaneously with the above-noted buffer write control processing. Read control initially inquires whether a data packet is ready for transmission 120. For example, is a data packet of specified size ready to transmit, i.e., is there enough data in the buffer to send out a packet? If "no", read control processing waits until receipt of sufficient data. If "yes", then the packet address is determined and a bus request is sent to obtain sufficient bus bandwidth to transmit the data packet 124. Once the bus grant is received, data is read from the FIFO buffer in bursts until the entire packet is transmitted 126, and the output pointer is incremented with the reading of data from the buffer. After transmitting the packet, processing determines whether an end of the video line has been reached 118 and proceeds therefrom as discussed above.

Figure 6:
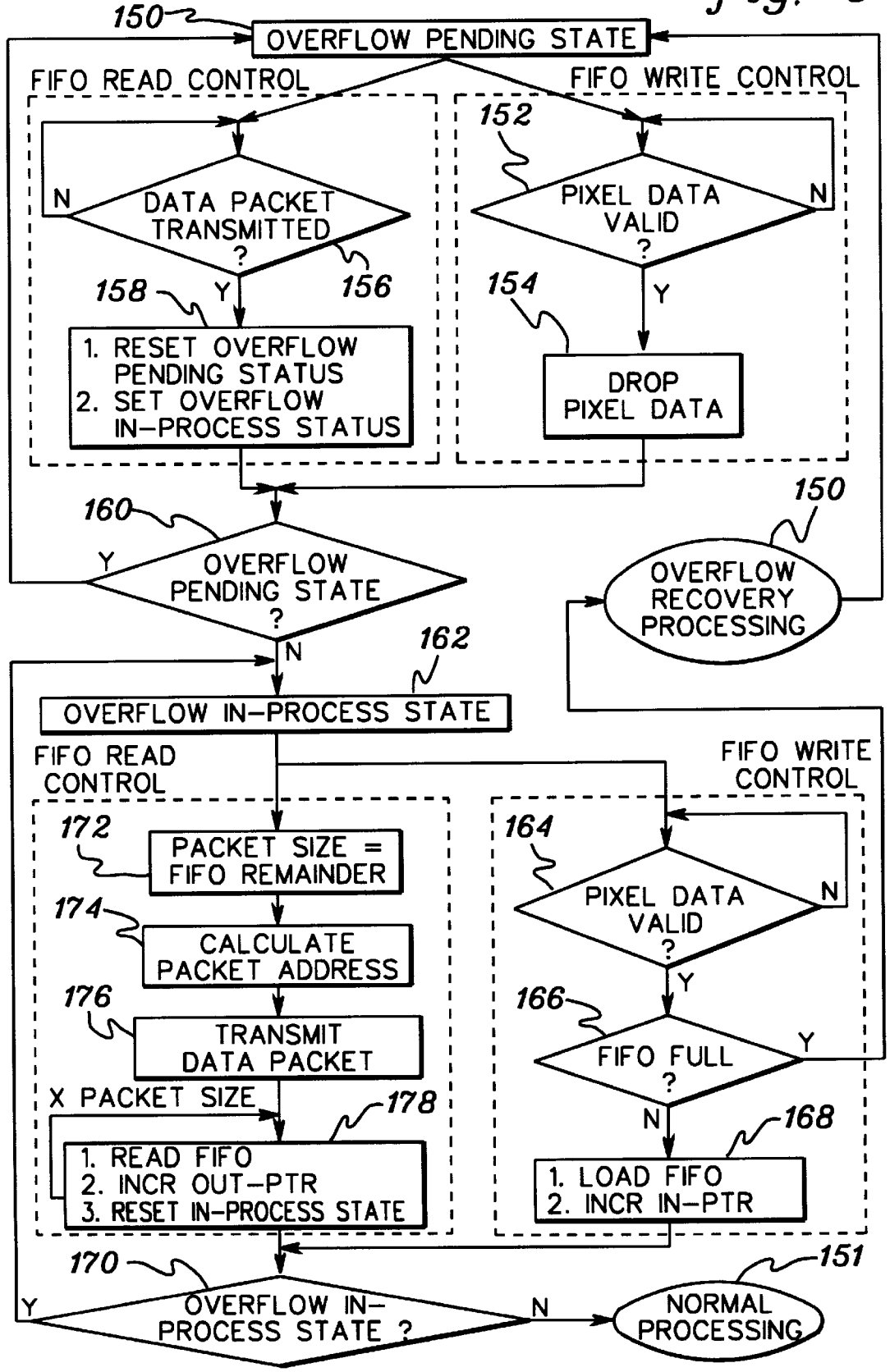
FIG. 6 is a flowchart of one embodiment of overflow recovery processing in accordance with the present invention.

FIG. 6 depicts one embodiment of overflow recovery processing in accordance with the present invention. This processing begins with detection of an overflow condition or overflow pending state 150. Upon detection of this state, the depicted buffer read and write controls proceed simultaneously. The write control initially determines whether valid pixel data has been received during the overflow pending state 152 and if yes, processing drops the data 154. Inquiry is then made into whether the overflow pending state is still valid 160, and if so, processing loops back to overflow pending state 150 and hence inquiry 152 to await receipt of the next valid pixel data.

During overflow pending state, data is read from the buffer once the pending bus request is granted. This data is read and output in the form of a packet as described above. Read control processing determines whether this data packet has been transmitted 156 and if no, the read control processing waits for transmission of the packet. Once the packet in process of transfer is completed, the overflow pending state is reset or cleared, and an overflow in-process state is set 158. Once the overflow in-process state is set, processing proceeds from inquiry 160 into the overflow in-process routine 162 where buffer write control and read control processing can again occur simultaneously. Beginning with the write control processing, processing waits until valid data is received 164. Upon data receipt, processing determines whether the buffer is full 166 and if so, return is made to overflow pending state 150 for further processing as described above. If there is room in the buffer, then the pixel data is loaded into the buffer and the input pointer is incremented 168. Processing then inquires whether the overflow in-process state is still set 170, and since the overflow in-process state can only be reset pursuant to read control processing, return is made to overflow in-process state 162 to await the next pixel data 164.

Read control processing begins with assignment of the remaining portion of the buffer to a next packet to be output onto the bus 172. The packet address for this packet is determined 174 to account for the discontinuity in data in the video line. A request for bus bandwidth is made 176 and upon granting, the video data remaining in the buffer prior to the discontinuity is read from the FIFO, the output pointer is correspondingly incremented, and the "in-process state" is reset 178. Upon resetting the in-process state, processing returns to the normal condition processing of FIG. 5 at the point where overflow recovery processing was called 151 (see FIG. 5).

FIGS. 7a, 7b & 7c depict bus bandwidth effects on video packet transmission for normal processing of data. In FIG. 7a, a horizontal video line is shown, FIG. 7b depicts transmission of data packets N through N+7 where the bus bandwidth is greater than the pixel data rate coming into the buffer, and FIG. 7c depicts buffer fullness. As shown in FIG. 7c, with transmission of each packet, data read from the buffer reduces the fullness of the buffer.

FIGS. 8a, 8b & 8c depict an overflow recovery processing state in accordance with the present invention. These figures show how buffer allocation changes relative to pixel data rate coming in and the data bandwidth available on the bus. FIG. 8a again shows a horizontal video line and FIG. 8b depicts bus bandwidth relative to pixel data rate coming into the buffer. In this case, the bus bandwidth is assumed to be less than the rate of pixel data into the buffer such that overflow conditions occur upon fullness of the buffer as shown in FIG. 8c. The overflow conditions result in data discontinuity between the data of packet N+1 and packet N+2, as well as between the data of packet N+3 and packet N+4. In accordance with this invention, the controller determines the new starting address for packets N+2 and N+4 relative to start of the horizontal video line. FIGS. 8a–8c also depict an example wherein the bandwidth is insufficient over a period of time for the pixel data rate into the buffer such that the processing switches multiple times between the normal condition processing of FIG. 5 and the overflow recovery processing of FIG. 6 as described above.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as part of a computer system or sold separately.

Presented herein is an approach for transmitting real-time video data on a non-real-time medium with minimal loss of perceptible picture quality. The video data transfer apparatus takes advantage of temporal redundancies between frames in the video system by dropping pixel data at random spatial locations when insufficient bus bandwidth is available and relying on the previously spatially located pixel data to replace the lost data. The effective result is transmission of a video image with "holes" where data was not transmitted. These holes are again replaced by the previous spatially located pixel data. Thus, in accordance with the invention, the video processing system is able to tolerate greater occurrence of insufficient bus bandwidth without degrading perceptible picture quality. Processing in accordance with this invention can be performed in place of or in addition to conventional techniques for reducing bandwidth of decompressed video data.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. A method for processing a line of video data for transmission across a bus, the line of video data being temporarily written to a buffer, the buffer being coupled to the bus for reading of data in blocks from the buffer to the bus, said method comprising:
    (a) detecting an overflow condition within the buffer;
    (b) upon detecting said overflow condition, discarding data from the line of video data being temporarily written to the buffer;
    (c) upon granting of a pending request for transmission of a pending block of video data from the buffer, transmitting the pending block of video data from the buffer to the bus, said pending request being pending prior to said detecting (a), and upon beginning said transmitting, discontinuing said discarding (b) of data from the line of video data being temporarily written to the buffer; and
    (d) providing at least one next bus request for transmission of at least one next block of video data from the buffer to the bus, said at least one next block of video data comprising all remaining video data in the buffer stored therein prior to said detecting (a) of the overflow condition.

2. The method of claim 1, further comprising determining an address for a new block of video data written to the buffer after said discontinuing (c) of said discarding of data from the line of video data being written to the buffer.

3. The method of claim 2, further comprising providing a new bus request for transmission of the new block of video data from the buffer.

4. The method of claim 2, wherein said determining an address comprises monitoring said discarding (b) to determine a discarded amount of data from said line of video data and using said discarded amount of data to determine the address for the new block of video data as an offset from a starting address of the line of video data.

5. The method of claim 1, further comprising repeating steps (b)–(d) for each overflow condition detected within the buffer.

6. The method of claim 1, further comprising setting an overflow pending state upon said detecting (a) of the overflow condition and resetting said overflow pending state upon transmitting (c) of the pending block of video data from the buffer to the bus.

7. The method of claim 6, further comprising setting an overflow in-process state upon resetting said overflow pending state, and resetting said overflow in-process state upon transfer of the at least one next block of video data from the buffer to the bus subsequent to a granting of the at least one next bus request of said providing (d).

8. The method of claim 6, further comprising setting said overflow pending state if a further overflow condition is detected subsequent to beginning said transmitting (c) of the pending block of video data, and repeating said steps (b)–(d).

9. The method of claim 1, wherein the bus comprises an internal bus of a computer, the buffer comprises a first-in first-out (FIFO) buffer coupled to the internal bus, data is read from the buffer to the bus in packets, and wherein the method is implemented within a video decoder, said line of video data comprising a line of a frame or a field of video data, and wherein said method further comprises repeating said processing for each line of video data of the frame or field.

10. The method of claim 1, wherein said line of video data comprises one line of a frame or a field of video data, and wherein said method is implemented within a video processing system, said discarding (b) creating gaps in said line of video data, and wherein said method further comprises filling said gaps in said line of video data with video data in a corresponding position in a corresponding line of video data in a previous frame or a previous field in the video processing system.

11. Apparatus for processing a line of video data, said apparatus comprising:
    a first-in first-out (FIFO) buffer;
    a bus coupled to the FIFO buffer; and
    a controller coupled to the FIFO buffer and to the bus for controlling processing of the line of video data through the FIFO buffer for transmission across the bus, said controller including means for:
        (i) detecting an overflow condition within the buffer;
        (ii) after detecting said overflow condition, discarding data from the line of video data being temporarily written to the buffer;
        (iii) transmitting a pending block of video data from the buffer upon granting of a pending request for transmission of the pending block of video data from the buffer, said pending request being pending prior to said detecting (i), and upon beginning said transmitting, discontinuing discarding (ii) of data from the line of video data being temporarily written to the buffer; and
        (iv) providing at least one next bus request for transmission of at least one next block of video data from the buffer to the bus, said at least one next block of video data comprising all remaining video data in the buffer stored therein prior to detecting (i) of the overflow condition.

12. The apparatus of claim 11, further comprising write control logic coupled between the FIFO buffer and the controller for coordinating writing of the line of video data to the FIFO buffer, and read control logic coupled between the FIFO buffer and the controller for coordinating reading of blocks of video data from the FIFO buffer to the bus.

13. The apparatus of claim 11, wherein the bus comprises an internal bus of a computer, and wherein the apparatus comprises a video decoder, said line of video data comprising a line of a frame or a field of video data, and wherein said controller comprises means for repeating said processing of said means for (i)–(iv) for each line of video data of the frame or field.

14. The apparatus of claim 11, wherein said controller further comprises means for determining an address for a new block of video data written to the FIFO buffer after discontinuing discarding of data by said means for discarding.

15. The apparatus of claim 14, wherein said controller further comprises means for providing a new bus request for transmission of the new block of video data from the FIFO buffer to the bus.

16. The apparatus of claim 14, wherein said means for determining comprises means for monitoring discarding of data by said means for discarding to determine a discarded amount of data from the line of video data, and means for using said discarded amount of data to determine the address for the new block of video data as an offset from a starting address of the line of video data.

* * * * *

UNITED STATES PATENT AND TRADEMARK OFFICE
CERTIFICATE OF CORRECTION

PATENT NO. : 5,986,714
DATED : November 16, 1999
INVENTOR(S) : Charles F. Marino It is certified that error appears in the above-identified patent and that said Letters Patent are hereby corrected as shown below:

ON THE COVER PAGE:

Item [54], delete "METHOD, APPARATUS AND COMPUTER PROGRAM PRODUCT FOR SELECTIVELY REDUCING BANDWIDTH OF REAL-TIME VIDEO DATA" and replace with --METHOD AND APPARATUS FOR SELECTIVELY REDUCING BANDWIDTH OF REAL-TIME VIDEO DATA--.

Col. 1, lines 1-4, delete "METHOD, APPARATUS AND COMPUTER PROGRAM PRODUCT FOR SELECTIVELY REDUCING BANDWIDTH OF REAL-TIME VIDEO DATA" and replace with --METHOD AND APPARATUS FOR SELECTIVELY REDUCING BANDWIDTH OF REAL-TIME VIDEO DATA--.

Signed and Sealed this

Third Day of April, 2001

*Attest:*

NICHOLAS P. GODICI

*Attesting Officer*   *Acting Director of the United States Patent and Trademark Office*